Nov. 26, 1929.  C. MILEWSKI  1,737,429
INSECT TRAP
Filed Jan. 7, 1928
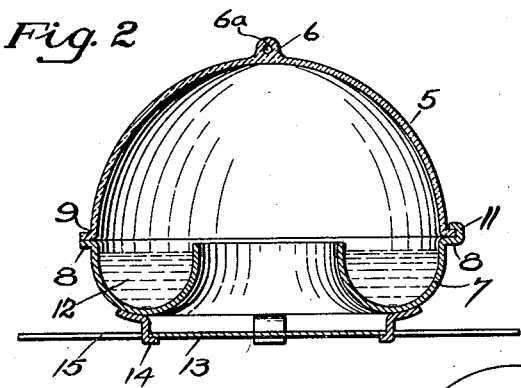
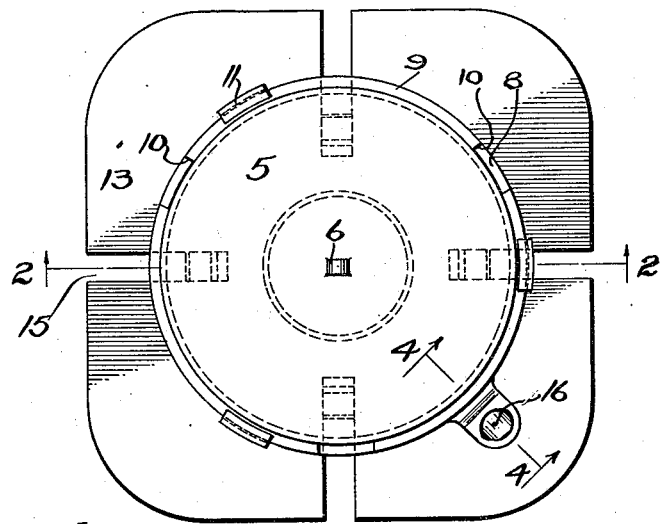
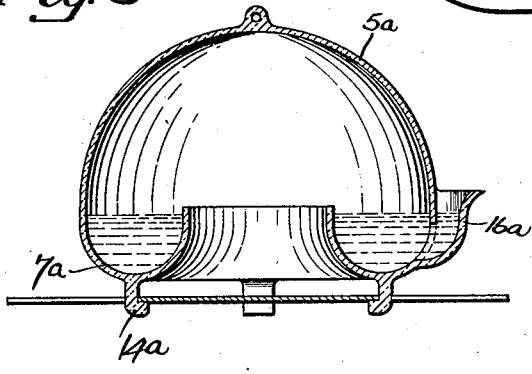
INVENTOR
Constanty Milewski
BY
ATTORNEY Patented Nov. 26, 1929

1,737,429

UNITED STATES PATENT OFFICE

CONSTANTY MILEWSKI, OF DETROIT, MICHIGAN

INSECT TRAP

Application filed January 7, 1928. Serial No. 245,074.

This invention relates to improvements in insect traps, and aims to provide a simple and efficient form of trap with which flies and other flying insects may be caught in such a manner that they will drown themselves in liquid contained in the lower portion of the trap.

Two preferred embodiments of the invention are hereinafter more fully described with the aid of the accompanying drawings, in which:

Figure 1 illustrates a plan view of one form of the invention.

Figure 2 shows a section on the line 2—2 of Figure 1.

Figure 3 is a similar section of a slightly modified form of construction, and

Figure 4 is a section on the line 4—4 of Figure 1.

Referring to the drawings, 5 designates a dome, preferably made of glass or other transparent material, having a substantially centrally located lug 6 at the top through which an opening 6ª is provided by which the device may be suspended. 7 indicates an annular trough having a flange 8 around its periphery which bears against a flange 9 around the underside of the dome. At intervals recesses 10 are cut in the said dome flange 9, and at corresponding intervals the trough 8 is provided with upward and inward extensions 11 so that by raising the trough against the underside of the dome the extensions may enter the recesses and the two flanges be brought together. Then by turning the trough with respect to the dome the extensions will grip the upper side of the dome flange 9 so that the two parts are then held together. In this construction the trough is usually made of metal and has depending lugs 14 brazed or otherwise secured to its underside. The lower ends of these lugs are inturned to support a platform 13, made of cardboard or other suitable material. This platform should project beyond the sides of the trough and be coated on its upper surface, towards the centre of the latter, with insect attracting material such as syrup. 15 indicates slots cut from the margins of the platform to facilitate the insertion and removal of the latter. In the side of the trough a spout 16 is provided for filling or emptying the said trough, and a water level should be maintained in the latter to prevent insects from crawling out through the spout.

Flies, or other flying insects, land on the side of the platform, walk towards the centre and feed on the syrup or other bait; they then fly upwards to leave. When they do so they strike the inner surface of the dome and, during their efforts, they fall back into the water or other liquid indicated at 12 in the trough and are drowned.

In the modified construction shown in Figure 3, the arrangement of parts is the same with the exception of the fact that the dome 5ª, trough 7ª, lugs 14ª, and spout 16ª are all made in one piece, preferably out of glass. The purpose of utilizing transparent material is, of course, so that insects will endeavor to fly through it.

While in the foregoing the preferred constructions have been described and shown, it is understood that these constructions are subject to such modifications as fall within the scope of the appended claims.

What I claim is:

1. An insect trap comprising a transparent dome, means for suspending said dome, an inturned annular trough adapted to contain liquid, a flange around the underside of the dome, an external flange around the outer side of said trough bearing against said dome flange, projections on said trough flange to engage said dome flange, the latter having recesses therein to permit disengagement of said projections, depending lugs on the underside of said trough having inturned ends, and a platform extending beyond the sides of said trough having radial slots therein from its margin to receive said lugs, and portions of said platform adjacent the inner ends of said slots resting on the inturned lug ends.

2. An insect trap comprising a transparent dome having an annular inturned trough on its underside adapted to contain liquid, means for suspending said dome, depending lugs on the underside of said trough having inturned portions at their lower ends, a platform under said trough projecting beyond the sides of the latter, said platform having radial slots therein, and the margins of said platform adjacent the inner ends of the slots resting on the inturned portions of the lugs.

CONSTANTY MILEWSKI.